Nov. 12, 1968          J. W. JENSSEN            3,410,014
                         TRAWL BOARDS
Filed April 26, 1966                        3 Sheets-Sheet 1
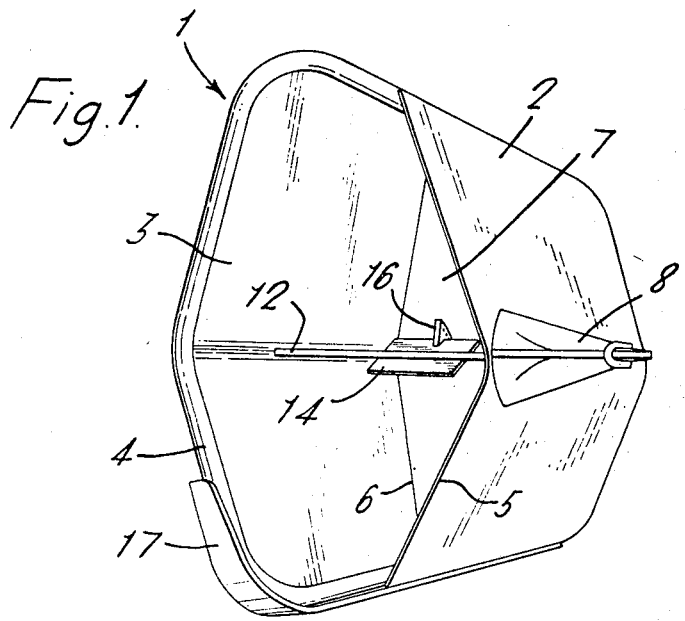
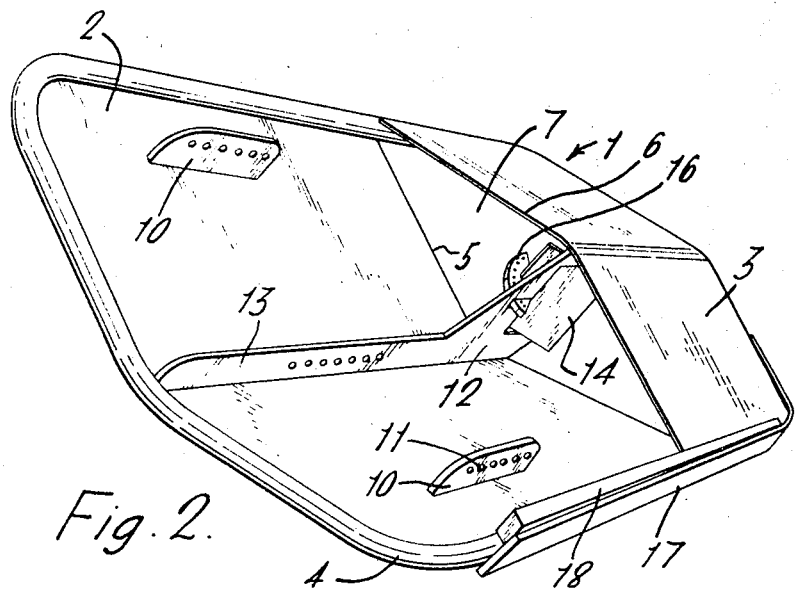

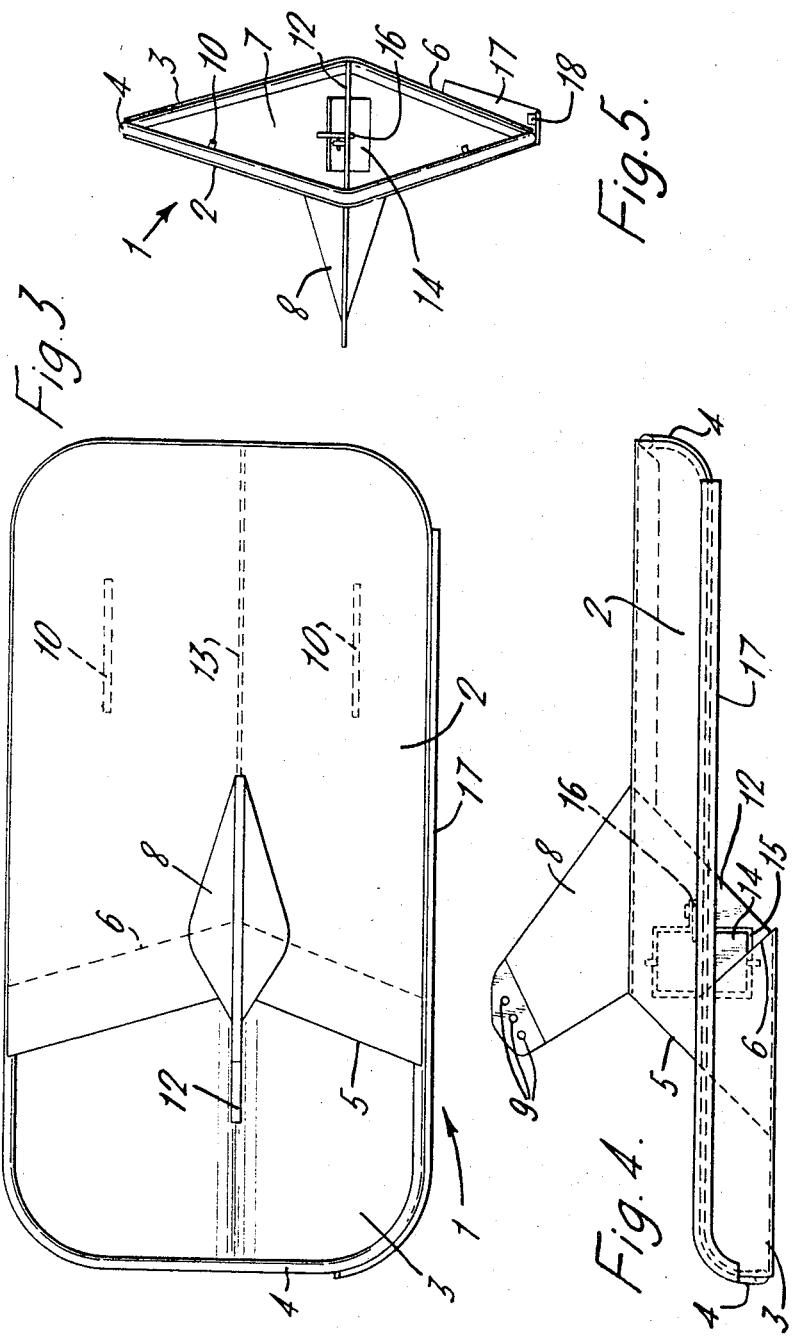

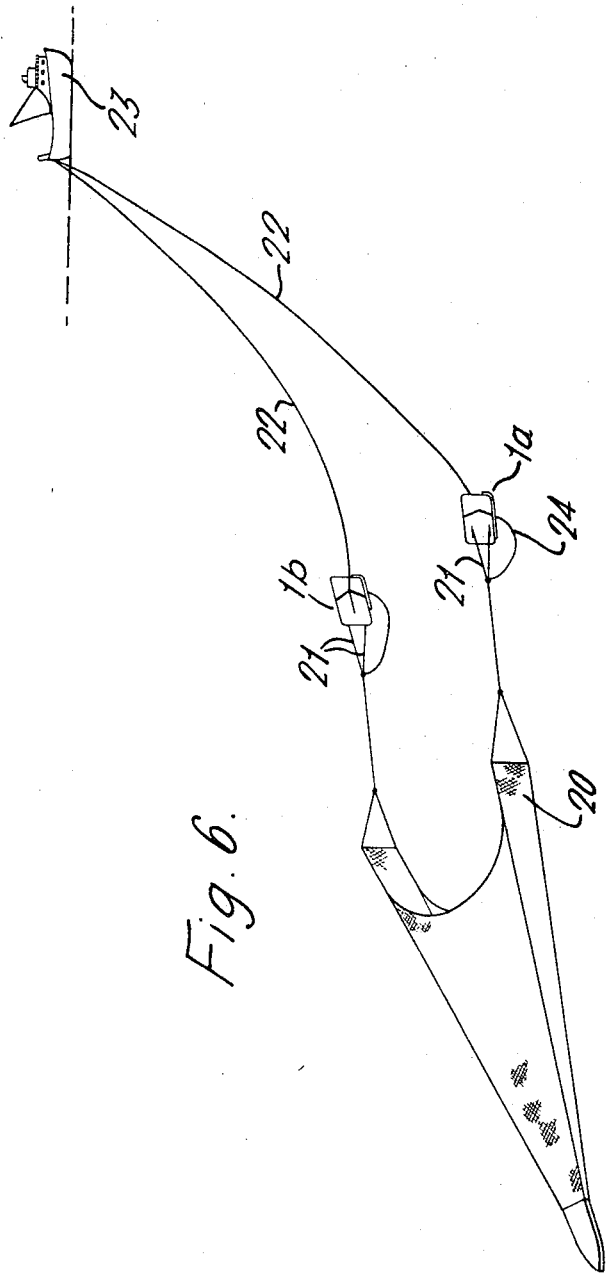

United States Patent Office 3,410,014
Patented Nov. 12, 1968

3,410,014
TRAWL BOARDS
Jens William Jenssen, Charles St., Westshore,
Napier, New Zealand
Filed Apr. 26, 1966, Ser. No. 545,373
Claims priority, application New Zealand, Apr. 26, 1965,
141,413
11 Claims. (Cl. 43—9)

ABSTRACT OF THE DISCLOSURE

A substantially rectangular trawl board defined by two sheet-like shear members, one of which members is approximately half the length of and substantially the same width as the other member. Frame means are fastened to each of the members for holding the members in opposed spaced relationship with their central longitudinal axes substantially parallel and with two adjacent ends overlapping slightly for providing a passageway therebetween. Attachment means is secured to one face of the longer member adjacent the overlapping end for coupling to a trawl warp. Net coupling members for connection to a net are attached to the longer member adjacent the non-overlapping end and on the opposite face to the attachment means.

---

This invention relates to trawl boards.

Trawl boards are placed on either side of a trawl net to assist in keeping the mouth of the net as widely spread as possible while the net is being towed from a single vessel. With existing trawl boards considerable frictional or drag forces are created as the trawl board is drawn through the water. These forces do not contribute to the spreading of the net but do increase the power necessary to tow the net.

It is therefore an object of the present invention to provide a trawl board which will reduce these forces resulting in frictional losses while still exerting sufficient spreading force on the net.

It is a further object of the present invention to provide a trawl board having a plurality of substantially parallel shear members in staggered or louvered arrangement, each said shear member being separated by a passageway from its adjacent shear member and frame means adapted to maintain the shear members in position so that in use the trawl board is easier to tow than a conventional trawl board having the same spreading force at the net.

It is a still further object of the present invention to provide a trawl board having a plurality of, and preferably two, parallel shear members in staggered or louvered arrangement with the shear members arranged in position so that the projected area of each shear member on to a plane normal to the direction in which the trawl board is towed in use almost lies adjacent to or slightly overlaps the projected area of the adjacent shear member on to the same plane.

One preferred form of the invention will now be described with reference to the accompanying drawings in which:

FIGURE 1 is a front perspective view of a trawl board according to the present invention, FIGURE 2 is a rear perspective view, FIGURE 3 is a side elevation of a trawl board, FIGURE 4 is an underneath plan view of the trawl board as shown in FIGURE 3, FIGURE 5 is an end view of the trawl board, and FIGURE 6 is a diagrammatic representation showing the trawl board in use.

In the preferred form of the invention a trawl board 1 is of substantially rectangular profile and comprises a longer shear member 2 of sheet-like dihedral configuration having an obtuse included angle about the central longitudinal axis and a short shear member 3 also being of sheet-like dihedral configuration having an obtuse included angle about a central longitudinal axis. The short shear member 3 is approximately as long as it is wide and is half as long as the longer shear member 2.

A tubular frame member 4 defines the perimeter of the trawl board 1 with each of the shear members 2 and 3 having three edges thereof fastened to the frame 4 to hold them substantially parallel about their longitudinal axes with the two unattached ends 5 and 6 slightly overlapping and defining a passageway 7 between them so that in an end view (FIGURE 5) the frame member 4 with attached shear members 2 and 3 assumes the configuration of a parallelogram. The edges 5 and 6 are preferably V'd slightly as is indicated in FIGURE 3.

An attachment member 8 is attached to the center of the long shear member 2 adjacent the overlapping end 5 to project away from the passageway 7. The attachment member 8 is preferably streamlined in profile and has a plurality and preferably three trawl warp coupling holes 9 therein to enable the angle of the shear to be adjusted by altering the position of the tow slightly.

Net coupling members 10 having a plurality of holes 11 therein are fixed to the long shear member 2 on the opposite face to the attachment member 8 and are disposed near the nonoverlapping end of the shear member, that is the trailing end in use.

A transverse plate 12 spans the passageway 7 to connect adjacent portions of the central axes of the overlapping ends of the shear members. The plate 12 is integrally formed with a strengthening rib 13 extending along the central longitudinal axis of the inner face of the longer shear member 2. An elevator plate 14 is pivotally mounted in an opening 15 in the transverse plate 12. An adjustment quadrant 16 is adapted to pass through a slot in the plate 12 and has a plurality of apertures therein to enable the elevator plate to be fixed in the appropriate position to an apertured lug fastened to the transverse plate to assist in controlling the depth at which the trawl board operates.

A skid member 17 comprising a suitable rectangular strip of metal is fastened on the flat to the frame 4 to overlie one long side of the frame and a suitable portion of the frame member adjacent to the forward end of the short shear member 3. A reinforcing bar 18 is also attached to provide additional strength for the skid.

It will be seen from the foregoing that in use the shear members 2 and 3 are maintained in position so that projected area of each shear member on a plane normal to the direction in which the trawl board is towed in use almost lies adjacent to or only slightly overlaps the projected area of the adjacent shear member on to that plane. Only two shear members have been described in the preferred form of the invention but a plurality of shear members in staggered or louvered arrangements could be used.

To ensure the maximum efficiency of a trawl board according to the present invention the area of the passageway 7 is such that it is approximately equal to the projected area of the longer shear member 2 on to a plane normal to the direction in which the trawl board 1 is being towed. The projected area will of course vary to some extent in use depending on the angle of shear which the board assumes, which in turn relates to factors such as the length of the trawl warps and the type of net. The area of the passageway is thus empirically determined for any particular combination.

The use of the trawl boards is diagrammatically illustrated in FIGURE 6. Trawl boards 1a and 1b, identical except as to the side on which the skid 17 and bar 18 are fixed, are each attached to either side of a net 20 with a sweep extending from the net bridle to the two back strops 21 fixed to the next coupling members 10. The trawl warp 22 from the towing vessel 23 is attached to the attachment member 8 with the lazy wire 24 provided in the known way. The trawl boards when used as described have been found to maintain a greater shearing force at the net than conventional trawl boards and are also easier to tow. It is thought the flow of water through the passageway 7 over the concave surface of the longer shear member 2 tends to lessen suction or the like frictional or drag forces which account for a considerable amount of power necessary to draw the trawl board through the water without contributing to the shear forces operable to hold the mouth of the net open. It has been found that for a 200 horsepower vessel trawl boards having overall dimensions of seven feet long and three feet six inches wide are satisfactory. Also for a 150 horsepower vessel trawl boards having overall dimensions of six feet long and three feet wide are satisfactory.

In this way an extremely satisfactory and efficient trawl board is provided.

What I claim is:

1. A trawl board of substantially rectangular profile, comprising a longer sheet-like shear member, a short sheet-like shear member being approximately half as long as and of substantially equal width as said longer shear member, a frame means fastened to each said shear member to hold said shear members in opposed spaced relationship with their central longitudinal axes substantially parallel and with two adjacent ends slightly overlapping to provide a passageway between the overlapping ends, an attachment member attached to one face of the longer shear member adjacent the overlapping end to project away from said passageway, said attachment member being adapted to be coupled to a trawl warp in use and net coupling members adapted to be coupled to a net in use, said net coupling members being attached to said longer shear member near the nonoverlapping end thereof and on the opposite face to said attachment member.

2. A trawl board as claimed in claim 1, wherein the minimum area of said passageway is substantially equal to the area of said longer shear member projected on to the plane normal to the direction in which the trawl board is towed in use.

3. A trawl board as claimed in claim 1, wherein said short shear member is substantially as long as it is wide.

4. A trawl board as claimed in claim 1, wherein said longer shear member has a dihedral configuration having an obtuse included angle about a central longitudinal axis and said short shear member has a dihedral configuration having an obtuse included angle about a central longitudinal axis and said frame means is arranged to support said shear members so that in end view said shear members assume the configuration of a parallelogram.

5. A trawl board as claimed in claim 1, wherein said frame member defines the perimeter of said trawl board and is fastened to three edges of each said shear member.

6. A trawl board as claimed in claim 5, including a skid means which is fitted along one of the longer sides of said frame and part of the ends thereof and is adapted in use to guide said trawl board over a seabed.

7. A trawl board as claimed in claim 1, wherein said attachment member is attached to the longer shear member along the longitudinal axis thereof, said attachment member having a plurality of trawl warp coupling holes therein.

8. A trawl board as claimed in claim 1, wherein a transverse plate is provided spanning said passageway to connect adjacent portions of the central axes of the overlapping ends of said shear members.

9. A trawl board as claimed in claim 8, wherein an adjustable elevator means is associated with said transverse plate to assist in controlling the depth at which said trawl board operates in use.

10. A trawl board as claimed in claim 9, wherein said elevator means includes an elevator plate pivotally arranged in an aperture in said transverse plate.

11. A trawl board of substantially rectangular profile comprising a long shear member of flat-faced dihedral configuration having an obtuse included angle about a central longitudinal axis, a short shear member, having a substantially equal length and width and being approximately half as long as and of equal width as said long shear member, said short shear member being of flat-faced dihedral configuration having an obtuse included angle about a central longitudinal axis, a tubular frame member defining the perimeter of said trawl board, said frame member being fastened to three edges of each said shear member to hold their longitudinal axes substantially parallel and with two adjacent ends slightly overlapping to provide a passageway between them so that in end view said frame member with attached shear members assumes the configuration of a parallelogram, an attachment member attached to one face of said long shear member along the longitudinal axis thereof and adjacent the overlapping end to project away from said passageway, said attachment member having a plurality of trawl warp coupling holes therein to enable the angle of shear to be adjusted in use, net coupling members having a plurality of holes therein and attached to said long shear member on the opposite face to said attachment member, said net coupling members being arranged near the nonoverlapping end of said long shear member, a transverse plate spanning said passageway to connect adjacent portions of the central axes of the overlapping ends of said shear members, said transverse plate having an opening therein, an elevator plate pivotally housed in said transverse plate, adjustment means enabling the angle made by said elevator plate to said transverse plate to be varied in use to assist in controlling the depth at which said trawl board operates, a skid member comprising a rectangular section strip fastened on the flat to said frame member to overlie one long side of said frame member and a suitable portion of said frame member attached to the end of said short shear member.

References Cited

UNITED STATES PATENTS 3,281,980   11/1966   Luketa                   43—9

FOREIGN PATENTS 370,994   3/1923   Germany.
508,039   9/1930   Germany.
    869      1898   Great Britain.
 21,279     1897   Great Britain.
271,218   5/1927   Great Britain.
801,878   9/1958   Great Britain.

WARNER H. CAMP, *Primary Examiner.*